Nov. 11, 1969     G. A. GRUSS ET AL     3,478,134

PROCESS FOR THE MANUFACTURE OF BOWLING PINS

Original Filed May 23, 1960

INVENTORS
GEORGE A. GRUSS
RICHARD A. SMITH
JOSEPH R. INFANTINO
BY
*Archer J. Plantamura*
ATTORNEY

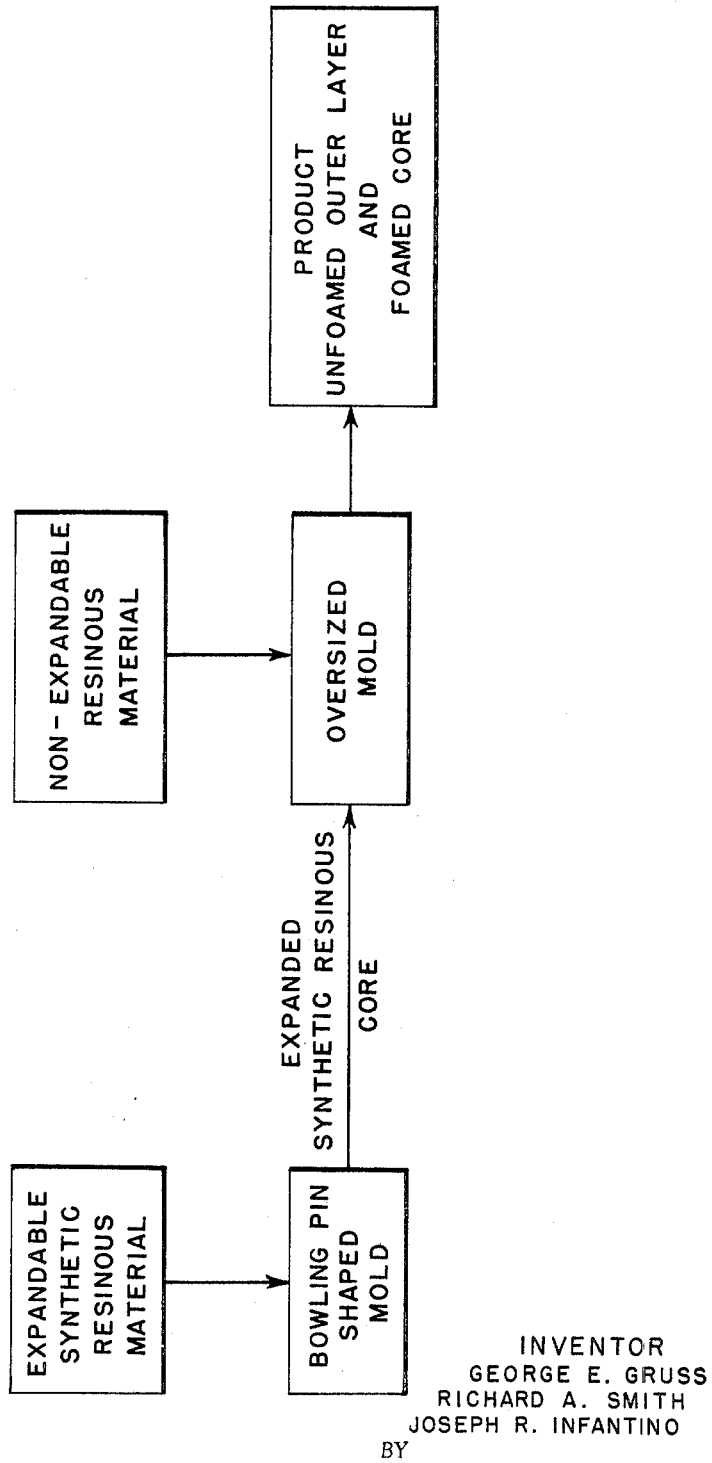

United States Patent Office 3,478,134
Patented Nov. 11, 1969

3,478,134
PROCESS FOR THE MANUFACTURE OF
BOWLING PINS
George A. Gruss, Shelby, Ohio, and Richard A. Smith, Cornwall on the Hudson, and Joseph R. Infantino, Chappaqua, N.Y., assignors to American Machine & Foundry Company, a corporation of New Jersey
Application June 19, 1964, Ser. No. 396,451, now abandoned, which is a division of application Ser. No. 31,161, May 23, 1960, now Patent No. 3,147,975, dated Sept. 8, 1964. Divided and this application Feb. 11, 1966, Ser. No. 538,886
Int. Cl. B29h 7/20; B29f 1/10
U.S. Cl. 264—45
7 Claims

ABSTRACT OF THE DISCLOSURE

The present invention relates to a method for the manufacture of bowling pins wherein an expanded, undersized, foamed core having the contour of a bowling pin and which is of suitable expandable resinous composition is formed in a mold, the core is then introduced and centered into another mold which is larger than the core and the space between the core and the mold walls is filled with a non-expandable resin after which the cellular structure of the core is cured, thereby forming a bowling pin having a shell of solid synthetic resin and a foamed resinous core.

---

This application is a division of application S.N. 396,451 filed June 19, 1964, now abandoned, application S.N. 396,451 being a division of application S.N. 31,161 filed May 23, 1960, now U.S.P. 3,147,975.

The present invention relates to an improved method of making bowling pins comprising a synthetic resinous composition. In general, the invention provides a method for making a more durable and inexpensive substitute for the conventional hard maple wood bowling pins.

The invention in a more specific and preferred embodiment relates to a method for making a bowling pin comprising a body of foamed or expanded synthetic resin having improved durability and impact resisting characteristics.

Heretofore, bowling pins have in general been manufactured from hard maple, a wood which is selected because it provides suitable durability and lightness of weight, good sonic characteristics and attractive pin rebound when struck, in comparison to other woods. While the bowling pin market for maple stock has increased due to the expanded popularity of bowling, and there has resulted an even more rapid consumption of pins because of greater usage, the availability of sound wood stock is gradually being depleted. Consequently, suitable quantities of good maple are less available while at the same time the cost continues to rise significantly. It is recognized, also, that hard maple has considerable variation in density and durability, which is disadvantageous from the standpoint of uniformity. It is highly desirable, accordingly, that a suitable substitute for wooden pins be found which is economical and preferably also more durable. The alternate material, if it is to be adopted for usage, must have characteristics which are at least as attractive as conventional pins and must have properties which meet the specifications set by (ABC) the American Bowling Congress, such as scorability, weight, strength (particularly at the neck portion of the pin) center of gravity, pin rebound characteristics, sonic quality on impact and the like.

The use of plastic pins has been attempted heretofore. However, such products have not been found satisfactory because of deficiencies in one or more of the requisite features. Our tests have indicated that excellent bowling pins comprising a core of plastic foam having durability substantially in excess of hard maple cores can be made. The composition forming the core can be uniformly reproduced to have, if desired, a density identical to that of hard maple. Additionally, the bowling pins are such that sonic characteristics and center of gravity may be suitably controlled.

It is, therefore, an object of the present invention to provide a method for making a bowling pin comprising an expanded synthetic resinous composition which meets requisite standards as a substitute for hard maple bowling pins. In a more detailed respect, it is the object of the present invention to provide a method for making a bowling pin comprising foamed synthetic resinous core composition and a solid synthetic resinous envelope therefor by forming an expanded, undersized foamed core in a mold, introducing the core into another mold larger than the core, filling the space between the core and the mold wall with non-expandable resin and curing the cellular structure of the core. Various other objects, features and advantages will become apparent as the description of the physical embodiments selected to illustrate the invention progresses.

In the accompanying drawing, forming a part of the specification, three embodiments of the invention are illustrated:

FIG. 7 is a diagrammatic flow sheet of the method of this invention.

One of the most attractive features of the present invention comprising an all plastic bowling pin is that the very significant differences in properties of pins which occur due to variations in different pieces of timber used in making pins of wooden core, e.g. density, can be eliminated. Uniformity of characteristics, which is much in demand, is thus obtainable. By the use of plastic foam, standardization of characteristics is facilitated and scorability based on skill is substantially more reliable. The plastic component or components of the pin can be so engineered that an overall density similar to the best wooden pins is produced. This density for plastic foam, for which the ingredients are measured, unlike wood is uniform and constant for all pins. Moreover, by techniques such as localized heating, during the foaming period of the expandable resin, the center of gravity of the pin may readily be controlled so as to consistently conform to American Bowling Congress specifications. Additionally, controlled foaming may be utilized to produce localized areas of increased strength for those parts of the bowling pin subjected to the greatest stress.

Figure 1:
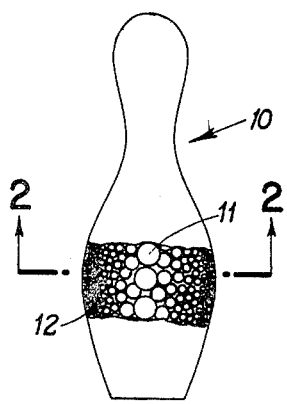
FIG. 1 is a longitudinal view partially in section of a pin according to the invention formed entirely of expanded synthetic resinous composition.
Figure 2:
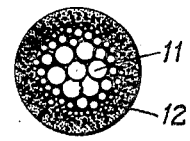
FIG. 2 is a cross-sectional view taken along line 2—2 of FIG. 1.
Figure 3:
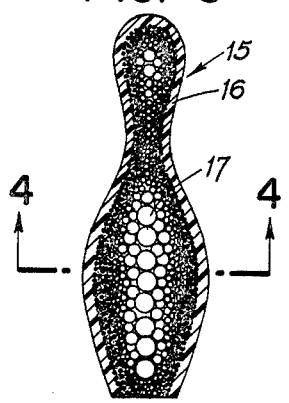
FIG. 3 is a longitudinal view of another embodiment of the invention in which the bowling pin comprises a solid outer envelope of plastic and a core of expanded synthetic resinous material.
Figure 4:
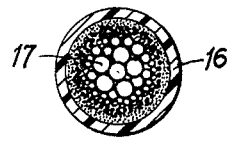
FIG. 4 is a cross-sectional view taken along line 4—4 of FIG. 3.

By reference to the drawings as hereinafter discussed more fully in detail, it is seen that the invention pertains in one embodiment to a bowling pin construction comprising all plastic rigid foam as shown in FIG. 1 and FIG. 2. As shown in FIG. 3 and FIG. 4, the pin may have a solid plastic envelope filled with a rigid plastic foam. The embodiment shown in FIG. 5 and FIG. 6 contains a reinforcing rod.

In FIG. 1, a pin 10 of a single chemical composition comprising a cellular or foamed composition is shown. In preparing the all foam structure, sufficient expanding agent to expand the composition to fill the mold is used. Preferably, and particularly where no solid plastic outer skin is used, at least a slight excess of the expanding agent is employed. The effect of excess expanding agent is to produce a structure of greater porosity, i.e. less density, at the central area 11 with a substantially void-free, denser, outer layer 12. Preferably, the density of the outer layer is at least about three times the density of a cellular structure in the central area of the foam pin core. This dense outer layer, compressed almost to solid condition, generally may vary in thickness from about 10 to about 500 mils at the surface of the pin. The thickness of this outer layer may depend on several factors. For example, it varies with the pressure build-up during molding, the method of introducing material into the mold, the mold temperature, and the formulation used. It will be apparent, therefore, that the quantity of agent necessary to produce the requiste foaming action and depth of the outer layer hereinabove described, may depend considerably upon such factors.

Any of the various expandible resinous compositions, including those referred to as thermosetting as well as those considered thermoplastic, may be employed. A foam density within the range of from about 20 to about 45 lbs. per cubic foot is preferably employed in preparing the foam pins of the invention. It is preferred that the foamed compositions have significant flexibility. This does not mean that it should not be rigid, but rather that the cellular mass should have sufficient plasticity to avoid brittleness and, consequently, result in cracking of the structure on repeated impact.

A wide variety of foamed resinous compositions known in the art, many for which the ingredients are commercially available, may be used. Suitable examples of such resinous compositions include:

The polyurethane foams.—In general, these products are the reaction products of an isocyanate and a polyol and more specifically, the reaction product of a diisocyanate and a polyester resin, e.g. adipic polyester, or a polyether resin, e.g. polyether glycols. Included in this category are both the rigid foams, generally of closed cell structure, as well as those recognized as semi-rigid foams, generally comprising a combination of open and closed cells. An example of a semi-rigid composition is the castor oil diisocyanate reaction product. This system utilizes water. In the course of the reaction, a polymer chain extension is effected and carbon dioxide is evolved which foams the composition. When the reaction is conducted at a proper rate, the carbon dioxide is trapped, making a closed cell structure. Use of a suitable catalyst cures the foam to solid state. Polyurethane may also be expanded by an alternate procedure of mechanical blowing using a low blowing liquid such as Freon or other low boiling fluorinated hydrocarbons. In general, longer chain polyols produce more flexibility in the product whereas polyfunctional branched low molecular weight polyols yield more rigid foams. Substantial control over the carbon dioxide released (which determines the density distribution, i.e. the thickness of the outer layer in a closed mold) is possible by altering the amount of excess diisocyanate and water used in the formulation;

Polyvinyl chloride foams.—In the formation of this material a vinyl plastisol, i.e. a paste of finely divided polyvinyl chloride containing a plasticizer and a chemical blowing agent, is employed. Upon the application of heat, and under pressure the polyvinyl chloride dissolves to form a gel and the chemical blowing agent produces the foaming gas. Upon cooling to room temperature, a solid material capable of retaining its shape results. Suitable foams may also be obtained from copolymers of vinyl chloride with vinylidene chloride and/or vinyl acetate and mixtures thereof with butadiene-acrylonitrile copolymers, for example;

Polystyrene, polymethylstyrene or copolymers thereof such as styrene-butadiene-acrylonitrile or styrene-acrylonitrile copolymers may also be used as the foam compositions. These resins are readily expanded, for example, by impregnating with a small amount of low boiling hydrocarbon, e.g. petroleum ether, pentane, etc., and then heating above the softening point of the polymer, thereby gasifying the volatile impregnant. A procedure of this type is described in U.S. Patent 2,681,321. Alternately nitrogen-producing foaming agents may also be used. Another method comprises dissolving under pressure normally gaseous compounds such as methyl chloride, methyl ether, methylethyl ether, propylene, etc., into the aromatic polymer, below the critical temperature of the gaseous agent to form a gel and releasing pressure on the compositions. A description of a like method, for example, appears in U.S. Patent 2,576,911.

Phenolic foams.—Two types are available, those produced by reacting the resin with an expanding agent and premixed foams comprising hollow phenolic spheres bound together and as a mixture with a suitable resin such as an epoxy, polyester, or phenolic resin. The former are foamed by catalysis. The reaction evolves water which upon conversion to steam expands the liquid phenolic resin to produce a cellular structure. Alternately air may be forced into the mixture by violent agitation coupled with addition of an acid catalyst, or blowing agents which evolve nitrogen may be employed. The latter process employs a mixture of hollow phenolic apheres with a liquid resin binder which is allowed to harden. The density is varied by varying the proportion of resin binder mixed with the spheres producing a foam which may vary in density from about 10 to about 40 lbs. per cubic foot;

Rubber latex cellular masses may be produced by beating air into the resin. The incorporation of various amounts of synthetic rubber may be employed to control the rigidity of the foam. Coagulating agents are employed to throw the rubber out of suspension;

Epoxy resin foams.—Expanded masses of this type, e.g. esters containing epoxide groups, bis-phenol containing epoxide groups, etc., are blended with blowing agents and foamed, for example, by amine catalysts wherein the exotherm causes the decomposition of the blowing agent. Densities of from 10 to about 40 lbs. per cubic foot are obtainable with compressive strengths in the high density foams in excess of 4000 p.s.i.;

Polyester foams.—Resins of dicarboxylic acids and glycols are expanded by whipping air into them or use of Freon or other low boiling fluorinated hydrocarbons;

Cellulose acetate foams.—This type of resin may be expanded, for example, by blending a water soluble material therein. On standing, organic solvent comes out of the mixture. When ample organic solvent has separated and the composition is sufficiently rigid so that it may be washed with water, the water soluble material is leached out, leaving pores or cells;

Polyethylene or polypropylene foams.—In preparing these cellular materials a thermally sensitive blowing agent which liberates gas at a spceific temperature is generally employed. A correct choice of blowing agent will effect a product most suitable for the characteristics desired in the pin. Various densities of polyolefins are available for producing a wide range of foam properties. Various copolymers and blends of these chemical compositions as well as copolymers thereof with other polymerizable constituents may be used, depending on the physical properties desired.

In the formation of the embodiment illustrated by FIG. 3 wherein an outer resinous envelope is employed and into which the resinous filler 17 is introduced and foamed, any of the various known foams having the properties described above may be used as the filler. As the envelope or shell material for which a solid resin is utilized, a variety of suitable compounds may be used. Illustrative resinous materials are such compositions as polyethylene or polypropylene, either high, medium or low density; nylon; epoxy resin; ethyl cellulose; polyurethane; acetal resin, which is a crystalline polymerized formaldehyde availiable under the trademark Delrin; cellulose acetate; cellulose propionate; copolymers of ethylene or propylene with butene, and the like.

Any of the various known methods most suitable for the resin employed may be used in forming the shell or envelope into which the resin is foamed as such. For example, blow molding, casting, or the centrifugal casting, injection molding, compression or transfer molding hot molding, or extrusion molding techniques. Generally a shell having a thickness of from about 10 to about 200 mils at the ball line and a thickness varying from about 50 to about 500 mils at the neck line of the pin is preferred.

In expanding the foamable material, e.g. a urethane, inside the shell of a thermoplastic material, e.g. polyethylene, the melting point of the shell composition should preferably be higher than that of the expandable polymer introduced therein. In a structure which utilizes a fairly thick shell, the need for an enclosing mold for the shell may be unnecessary depending on the shell thickness, properties of the shell composition and expandable resin and the temperature employed. Where the shell is thermoplastic, it is necessary that the expandable resin, when foamed inside the shell, have a melting point not exceeding that of the shell.

In blow molding envelopes or skins of various densities of materials such as high density polyethylene copolymer or nylon, a procedure which may suitably be employed is to blow mold the skin undersize, place it in a suitable mold and expand the skin to mold size with a pressure generating expandable composition. In stretching, the resin forming the skin is oriented biaxially, enhancing the physical properties thereof.

In the preparation of a shell or skin by centrifugally casting a molten polymer, suitable weight distribution, i.e. strengthened areas, may be obtained by controlled positioning and motion of the mold during formation.

Figure 5:
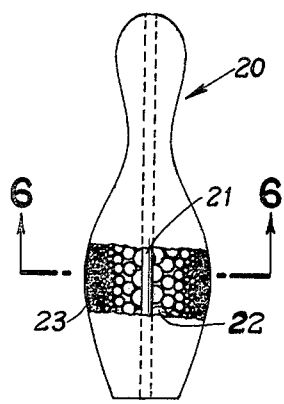
FIG. 5 is a longitudinal view of another embodiment showing a structure containing a reinforcing rod within the center of the resinous foam structure.

In the foam pin, represented in FIG. 1 and FIG. 5 in which the molded pin as a whole comprises solely expanded resin, i.e. the structure has no solid outer shell, it will be understood that an outer protective coating may be applied after the foamed pin is formed to enhance the appearance, to increase resistance to dirt pick-up, and/or to modify the coefficient of friction. For this purpose, any of the suitable coatings used on conventional wood bowling pins may be used. A good covering, for example, is the 4-coat system comprising (1) an epoxy resin prime coat, (2) a modified nitrocellulose seal coat, (3) an ethyl cellulose protective coat, and (4) a final surface coat of modified nitrocellulose. Other combinations of this multicoat system such as two coatings of (3) and/or (4) of the above system or the (1), (3), (4), combination may be used. Various additional coating systems which are well known in the art as, for example, those disclosed in U.S. Patent 2,357,458, may also be used. Such coatings may be applied by conventional techniques such as dip, flow, brush, spray, gel coat application and the like.

Figure 6:
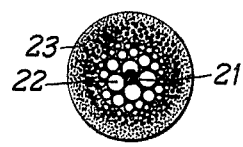
FIG. 6 is a cross-sectional view taken along line 6—6 of FIG. 5.

The reinforcing member 21 shown in FIGS. 5 and 6 may be of any suitable configuration and cross-section or it may comprise a plurality of filaments in a bundle or suitably spaced as a matrix within the pin core. Such element is illustrated as plastic, but it may be fiber glass, wood or metal in addition to various plastic materials such as nylon, acetal resin, cellulose acetate butyrate, and the like. It is apparent, also, that the reinforcing element may be inserted in either of the modification, i.e. bowling pins utilizing an outer skn as well as those formed wholly of cellular plastic in which no outer shell is used as the envelope to shape the foam.

Because of the extreme stress resulting from usage at the base of the pin, it may be desirable to cut out an annular segment from the base of the pin for the purpose of inserting a reinforced base; such base insert may be any suitable nylon or cellulose acetate butyrate, for example. Various procedures and techniques of reinforcing bowling pin bases in this manner are known and may be used. An example is that provided in U.S. Patent 1,585,123.

When it is necessary to modify the sonic quality of the pin, this may be accomplished by localized heating of the resinous conposition during foaming thereby modifying the density in specific areas. Also, the tone quality may be modified by use of a hollow or partially hollow cylindrical plastic cap such as one having a T-shaped cross section appropriately inserted vertically as by screw-in arrangement, into the top of the head of the bowling pin.

In order that the present invention may be more fully understood, the following examples are set forth for purposes of illustration. Any specific enumeration of details should not be interpreted as a limitation except as expressed in the appended claims.

In the examples, an aluminum book-type mold was used, the cavity of which conformed approximately to ABC pin measurement specifications. The base portion of the cavity was used as the gate through which foam material of various formulations and modifications was introduced. In those pins prepared with an outer envelope of solid resin, the envelope was placed in the mold and again the base of the pin was used as the gate through which the expandable composition was introduced.

EXAMPLE 1

Ten bowling pins are made the following composition and procedure being used for each.

Composition: Gm.
  Diisocyanate (Resin 6005 [1]) _____ 666.6
  Polyester (water containing) (Resin 6000–878–4 [1]) _____ 155.0
  Polyester (anhydrous) (Resin 6000–878–142 [1]) 630.6
  Catalyst (dimethylethanolamino) _____ 4.0

[2] 1456.2

[1] Available under the trademark Selectrofoam from Pittsburgh Plate Glass Co.
[2] Or 3 lbs., 3.2 oz.

Procedure

The catalyst and polyesters are thoroughly mixed and then added to the diisocyanate. The entire charge is mixed rapidly and thoroughly for a period of 30–45 seconds. At this point the foaming action begins and the material is poured into the mold and the mold capped. A relativly high exotherm develops in the closed system, providing a self-curing mechanism for the ensuing foam. The molded pin is removed from the mold after about 40 minutes. A substantially complete cure of the molded pin is effected after standing for about 1½–3 hours at room temperature. This post-cure period may be shortened by increasing the post-cure temperatures.

Pins so produced are cream-colored and glossy (the surface being as smooth and regular as that of the mold). There is no visibly apparent foam structure at the pin surface. Rather, the surface appearance is a hard, smooth, semi-glossy, void-free outer layer varying in thickness from approximately 30 to 375 mils. The thickness of this layer appears to be a function of the pressure built up during molding, the method of introducing material into the mold, plus mold temperature. In the molding technique used, the pin head region was filled first; the outer layer thickness at the head-neck region of resulting pins is several times greater than that at the ball line.

Moving from the outer layer toward the pin's central region, a definite foam structure becomes increasingly prevalent. Well over 80% of the foam's cell structure is so fine as to be indiscernible by the naked eye. There exists a considerable number of larger voids of 15 to 25 mils diameter; these are most likely due to inefficient mixing prior to molding.

EXAMPLE 2

In the following run a total of six pins are prepared; two blow molded shells of polyethylene (Phillips Chemical Company, Marlex), one shell approximately 125 mils thick and one shell approximately 500 mils thick; two of ethyl cellulose (Dow Chemical Co. Ethocel) of approximately the same thickness; and two of nylon (Du Pont Zytel), one about 125 mils and one about 200 mils. They are filled with foamed polyurethane using a procedure and mixture which produces a lower density foam, i.e. (one having a density which may vary from about 5 to 30 lbs. per cubic foot) than that employed for Example 1, in order to allow for the weight of the outer shell.

The following formulation is mixed in the same manner as described in Example 1 except that the resins are preheated to approximately 120° F. (Preheating eliminates surface cracks and fissures in the molded core which occur at this density level.) The quantity of foamable resin is adjusted to the shell weight to produce pins of approximately 3 pounds 5 ounces.

| | Parts by weight |
|---|---|
| Diisocyanate | 45.35 |
| Polyester (water containing) | 10.88 |
| Polyester (anhydrous) | 43.52 |
| Catalyst (dimethylethanolamine) | 0.25 |

Procedure

The pre-formed shell having an orifice at the base is placed in the mold having a cavity conforming to the skin contour. Mold and skin are at room temperature. The shell is placed base-up in the mold. The expandable mixture of ingredients is poured into the mold-encased skin through the base orifice; the mold is then quickly capped with a metal plate and clamps. The mold and contents are placed in an oven and given a post cure. As required by the specific formulation, approximately 1 hour at 200° F. is employed. The mold and contents are allowed to cool to room temperature and the foam filled bowling pin is removed. Each of the six pins is comparable to the properties of the pins prepared in Example 1. The strength at the neck is improved over the pin in which no outer shell is employed.

Each of the pins in these examples had a pre-estimated density of greater than 30 lbs. per cubic foot and had the following physical properties:

| | |
|---|---|
| Linear dimensional change (15 hrs. @ 200° F. | None. |
| Freeze resistance (72 hrs. @ −10° F., percent dimensional change) | None. |
| Deformation temperature | Greater than 250° F. |
| Compressive strength (@ 25% compression) | Greater than 4000 p.s.i. |

EXAMPLE 3

Addition of plasticizers to alter the scleroscope (bounce property) reading of foamed pins.

The addition of plasticizers to the polyester resin during the mixing stage is found to alter the foamed pins' rebound characteristics significantly.

Formulation: (per 100 parts)

| | Parts by weight |
|---|---|
| Selectrofoam resin 6005 | 46.15 |
| Selectrofoam resin 6000–878–142 | 42.87 |
| Selectrofoam resin 6000–878–4 | 10.73 |
| Dimethylethanolamine | .25 |

To this formulation is added 5% (of total weight) of didecylphthalate available as Flexol 10—10 from Union Carbide Corporation. The composition is mixed and molded as described in Example 1. In this example, no outer shell is used. Resulting scleroscope reading of the bowling pin at the ball line is approximately 65. This is compared with a scleroscope reading of 63 when no plasticizer is employed. When a run in repeated using a like formulation with the exception that there is added 20% (of total weight) Flexol 10—10, mixing and molding is carried out as in Example 1, the resulting scleroscope reading at the ball line is approximately 85.

EXAMPLE 4

Formulation

Total pin weight 3 lb. 5 oz.

| | parts by weight |
|---|---|
| Epoxy resin | 1000 |
| Hydrazide blowing agent | 20 |
| Emulsifier (Tween #40, Atlas Powder Co.) | 1 |
| Toluene | 45 |
| Diethylenetriamine | 60 |

Procedure

The epoxy resin is heated 80° C. and mixed thoroughly with the toluene, emulsifier and blowing agent. The diethylenetriamine curing agent is added and mixed thoroughly for 30 seconds. The mixture is poured into the mold, the mold is capped and heated at 185°–250° F. for 2½ hours and then cooled to room temperature before removing the molded pin.

EXAMPLE 5

The procedure of Example 2 is substantially repeated except that an undersized ethyl cellulose shell into which the foamable mixture is poured, is used. In this run the expanding agent is increased to 80 parts and the epoxy resin reduced to 800 parts. The temperature used is in the range of 240°–310° F. The exotherm and curing heat softens the thermoplastic ethyl cellulose shell, expands the shell to standard size, and effectively binds the foam to the shell by an intermix in a semi-liquid phase. This technique employs a shell undersized from standard of at least 2% or about 100 mils at the ball line diameter, and preferably a shell undersized not more than about 15%.

EXAMPLE 6

Expandable polystyrene as free flowing beads containing an integral blowing agent commercially available from Koppers Co., Inc. as Dylite are employed. The beads may be utilized in the unexpanded stage or in the partially expanded stage to produce widely varying densities ranging from less than one pound per cubic foot up to about 40 pounds per cubic foot. By mixing expandable polystyrene beads with epoxy resin and curing agent, it is possible to use the epoxy-reaction exotherm to aid in the heating required to expand the styrene beads or complete expansion of the partly foamed beads. The cured epoxy affords additional strength and cohesiveness to the resulting foam structure. This system is described at page 300 of Modern Plastics, Encyclopedia Issue for 1960, September 1959, Breskin Publications, Bristol, Conn.

Formulation

| | Parts by weight |
|---|---|
| Polystyrene beads | 120 |
| Epoxy resin (Shell Co., Epon 828) | 30 |
| Curing agent (diethylenetriamine) | 9 |

Procedure

The polystyrene beads are partially expanded by heating with common infra-red lamps held 4–5 inches away from a tray in which the beads are spread. Several minutes heating is required. (Pre-expansion is not essential to the procedure but it helps insure uniform expansion in the finished product.) The beads are then allowed to cool. The weighed amount of the epoxy resin is added to a kneader-type mixer. With agitation the curing agent is added to the resin. The pre-expanded polystyrene beads (pre-weighed) are gradually added to the mixer and mixing is continued until a thick, putty-like mass is obtained and is then introduced into the bowling pin mold at room temperature. The epoxy reaction isotherm is sufficient to expand the polystyrene beads in approximately 1 hour, although it may be desirable to apply heat (not in excess of 250° F.) to expedite and assure more uniform and complete expansion. The mold and contents are then allowed to cool to room temperature before removal of the molded pin from the mold. Variations in the pre-expanding and bonding of polystyrene beads may be employed. As reinforcement for the pin, a nylon sleeve at the ball line or a surface coating of glass reinforced epoxy resin as disclosed in the above reference may be employed.

EXAMPLE 7

The procedure of Example 1 is substantially repeated with the exception that an undersized mold having a cavity diameter ¾ inch less than the finished pin of standard specifications is used to form a foam core. The mold is equipped and adapted to receive aluminum center dowels at the head and base. A finished pin of 3 lbs. 5 oz. is prepared as follows: A measured quantity of the expandable composition of Example 1 providing a core of 1 lb. is measured, introduced into the mold, and expanded to fill the undersized mold. The molded foam core containing the centering dowels imbedded about 4 inches in the foamed core is subsequently centered in a mold having a resin inlet aperture at the base and a filled indicator hole at the head near the dowel support hole. The mold is of standard size, i.e. having a diameter ¾ inch larger than the molded foam core. A commercially available self-curing ethyl cellulose resin having a density such that when approximately 37 ounces of the resin is cast into the mold, it is sufficient to fill the space between the core and mold cavity. This resin provides a uniform shell about the core having a substantially overall uniform thickness of ⅜ inch. The shell is allowed to cure. The dowels at the head and base are removed. A T-shaped cap is inserted in the head of the pin and a conventional base is fitted onto the bowling pin. The cap and base are formed of commercially available flexible casting epoxy resin.

EXAMPLE 8

The procedure and apparatus of Example 7 are employed, with the exception that the outer shell is formed of flexible cast epoxy resin. The ratio of weight of core to shell is 1 lb. 2 oz. of foamed resin to 2 lbs. 3 oz. of solid epoxy resin shell.

EXAMPLES 9–10

The procedure of Example 7 is substantially repeated with the exception that (9) a polyurethane resin solid shell and (10) a polyethylene shell are cast over a polyurethane foam core to produce a 3 lb. 5 oz. bowling pin.

EXAMPLES 11–12

A core of polyurethane is formed in a mold having a cavity ½ inch less than the finished standard size. The core weight is 1 lb. 6 oz. The core is replaced in the mold having a cavity of a standard size pin and (11) a ¼ inch layer of commercially available glass filled nylon (Fiberfil, Inc.) (1 lb. 9 oz.) is cast about the periphery of the center dowel supported core. The dowels are removed and flexible epoxy cap and base are fitted into the pin. In a similar run (12) unfilled nylon is employed.

Molded foam plastic pin weights can be maintained within a tolerance of plus-or-minus 15 grams even with hand-mix methods. It is most difficult to obtain wooden pins with this degree of weight constancy. A lack of uniformity obtained with wooden pins often requires their sale at reduced prices due to high weights and subsequent low scorability. Automatic mixing, metering and transferring apparatus reduces the weight deviation in the foam pin to the order of less than two grams. Thus, the order of control over wooden pins, which, due to their varying density and porosity which affects coating composition pick-up, is better than 10 fold.

With proper molds any desired pin dimension can be achieved and held within several mils. ABC pin-measurement specifications can be met with a considerable margin for unaccounted for deviations.

The average scleroscope value or bounce characteristic of ten experimental foamed pins is in the vicinity of 67 to 70. The value desired by ABC for standard pin scorability is at least 65; this is as close to the desired value as the most commercially attractive pin known to be available. Moreover, the scleroscope reading may be controlled considerably by the use of plasticizers in the foam composition. This control is not known to be attainable with the wooden pins as a practical matter.

The difference between the sonic characteristics of the rigid and semi-rigid foams and hard maple under impact is indistinguishable by the human ear in most instances. Generally, the foam material exhibits the characteristic "ring" of hard maple, or may be readily modified to produce this result, e.g. the foaming can be controlled by localized heating or the pin provided with recesses so as to approximate the sound of hard maple pins. In order to more clearly define this similarity, the audio characteristics evolving from the impact of both the rigid foam and hard maple were analyzed electronically. Dimensionally similar blocks of the rigid foam and hard maple were dropped from a six-inch height onto hard maple. The sound produced from each impact was electronically recorded at a tape speed of 15 in./min. and the resulting amplified audio signals fed separately into a band-pass filter in the 60 cycles/sec. region. Oscilloscopic examination of corresponding segments of each "filtered" signal showed a difference of less than 2 cycles/sec.; in the 2 kilocycle band the difference was less than 50 cycles/sec.

One of the most attractive features of the foam plastic bowling pin of the present invention resides in the resistance to compression at the ball line. In the impact testing of foamed polyurethane pins using a rotary impact tester, attention was focused mainly on the pins' ball-line area. At 1,000 blows the ball-line compression exhibited by a foamed plastic pin is approximately 28 mils, whereas a commercially available wooden core shows 125 mils of compression at this test level, and a commercially available plastic coated pin exhibits 70–80 mils compression.

What is claimed is:

1. A method of making a bowling pin comprising a shell of solid synthetic resin having the general contour of a finished pin and a foamed resinous composition filling substantially the entire volume of said shell which comprises pre-forming an expanded undersized foam core having the contour of a bowling pin, introducing and centering the core into a mold having a contour of a bowling pin larger than said core, introducing into said mold around said core a quantity, when added to the core weight, commensurate with the weight of a finished bowling pin and in amounts at least sufficient to entirely fill the mold, of a non-expandable resin, and curing the cellular structure to substantially fill the entire space within the shell.

2. The method of claim 1 in which the outer unexpanded layer is an epoxy resin.

3. The method of claim 1 in which the outer unexpanded layer is polyethylene.

4. The method of claim 1 in which the outer unexpanded layer is nylon.

5. The method of claim 1 in which the outer unexpanded layer is ethyl cellulose.

6. The method of claim 1 in which the core is polyurethane foam and the outer unexpanded layer is polyurethane.

7. The method of claim 1 in which the core is polyurethane and the outer layer is polyethylene.

References Cited

UNITED STATES PATENTS

| 3,090,620 | 5/1963 | Consolloy | 273—63 |
| 3,229,977 | 1/1966 | Guglielmo | 273—82 |
| 3,270,108 | 8/1966 | Randolph | 273—63 XR |

FOREIGN PATENTS 735,332  5/1966  Canada.

OTHER REFERENCES

Netherlands printed application, No. 6,403,902, October 1964.

PHILIP E. ANDERSON, Primary Examiner

U.S. Cl. X.R.

156—213; 161—160; 260—2.5; 264—54, 275, 271